United States Patent [19]
Hendrickson

[11] Patent Number: 5,697,062
[45] Date of Patent: Dec. 9, 1997

[54] METHOD AND APPARATUS FOR IMPROVED LINK ESTABLISHMENT AND MONITORING IN A COMMUNICATIONS SYSTEM

[75] Inventor: Alan F. Hendrickson, Austin, Tex.

[73] Assignee: Advanced Micro Devices, Sunnyvale, Calif.

[21] Appl. No.: 191,818

[22] Filed: Feb. 4, 1994

[51] Int. Cl.⁶ .................................................. H04B 7/26
[52] U.S. Cl. .................. 455/51.1; 455/54.1; 370/350; 375/368; 379/61
[58] Field of Search ......................... 455/33.1, 34.1, 455/34.2, 51.1, 54.1, 67.1, 67.3; 379/61, 62, 63; 370/350, 509, 514; 375/364, 365, 368

[56] References Cited

U.S. PATENT DOCUMENTS

| | | | |
|---|---|---|---|
| 4,905,272 | 2/1990 | Van de Mortel et al. | 379/62 |
| 5,280,541 | 1/1994 | Marko et al. | 379/61 |
| 5,384,828 | 1/1995 | Brown et al. | 379/61 |
| 5,463,383 | 10/1995 | Pache | 340/825.44 |
| 5,561,852 | 10/1996 | Heeschen et al. | 455/54.1 |

*Primary Examiner*—Reinhard J. Eisenzopf
*Assistant Examiner*—Lee Nguyen
*Attorney, Agent, or Firm*—Merchant, Gould, Smith, Edell, Welter & Schmidt, P.A.

[57] ABSTRACT

A method and apparatus for radio frequency (RF) link establishment is disclosed. The method and apparatus uses messages with a set data field containing N-bit channel markers and synchronization words for link establishment and monitoring. The present invention allows for correct detection of the initial channel marker even if less than N bits are received correctly.

23 Claims, 10 Drawing Sheets

METHOD AND APPARATUS FOR IMPROVED LINK ESTABLISHMENT AND MONITORING IN A COMMUNICATIONS SYSTEM

CROSS-REFERENCE TO RELATED APPLICATIONS

This application is related to the following U.S. patent applications:

| SERIAL NO. | TITLE | INVENTOR(S) |
|---|---|---|
| 07/917,497 | General I/O Port Interrupt Mechanism | Gulick, et al. |
| 07/917,489 | Improved External Memory Access Control for a Processing Unit | Gulick, et al. |
| 07/917,488 | Method of Weak Pull-up Disable and Mechanism Therefor for Use with Microcontroller in Integrated Circuit and Cordless Telephone Using the Integrated Circuit | Bowles, et al. |
| 07/917,503 | Interrupt Mask Disable Circuit and Method | Bowles, et al. |
| 07/918,627 | Integrated Circuit and Cordless Telephone Using the Integrated Circuit | Gulick, et al. |
| 07/918,626 | Modulator Test System | Peterson, et al. |
| 07/918,625 | Keypad Scanner Process and Device and Cordless Telephone Employing the Mechanism | Gulick |
| 07/918,624 | Serial Interface Module and Method | Gulick, et al. |
| 07/918,631 | Low Power Emergency Telephone Mode | Peterson, et al. |
| 07/918,632 | In-Circuit Emulation Capability Mode in Integrated Circuit and Cordless Telephone Using the Integrated Circuit | Gulick, et al. |
| 07/918,622 | Clock Generator Capable of Shut-down Mode and Clock Generation Method | Peterson, et al. |
| 07/918,621 | Signal Averager | Gulick |
| 08/192,007 | Power Management Circuit for Use in Digital Cordless Telephones and Like Apparatus | Hendrickson, et al. |
| 08/191,949 | Apparatus and Method for Sending Signal Data | Schnizlein, et al. |
| 08/579,075 | Burst Synchronization of Time Division Multiplexed Transceiver Pairs | Schnizlein |
| 08/181,994 | Receiver Quality Measurement System for Use in Digital Cordless Telephones and Like Apparatus | Hendrickson, et al. |
| 08/192,046 | Dual-Mode Baseband Controller for Radio-Frequency Interfaces Relating to Digital Cordless Telephones | Hendrickson, et al. |
| 08/668,600 | Method and Apparatus for External Intermediate Data Processing | Mullins, et al. |
| 08/402,721 | Metal Programmed Transistor Array | Allee |
| 08/191,948 | Input/Output Data Port and Method | Mullins, et al. |

All of these related applications are assigned to the assignee of the present invention and are hereby incorporated herein in their entirety by this reference thereto.

BACKGROUND OF THE INVENTION

This invention relates generally to a method and apparatus for improved radio frequency (RF) link establishment and maintenance in a communications system and, more specifically, to a method and apparatus for improving link establishment and monitoring in a RF communications system.

A conventional cordless telephone system consists of a fixed base station and a portable handset (phone). A user receives and makes calls through the handset which, in turn, communicates with the base station through a RF communications link. Because rapid advances in electronics have led to increasingly sophisticated phone functions and smaller phone size, the use of cordless telephone systems is becoming widespread. Several cordless telephone system standards have been developed and are in use today. Cordless Telephony Generation 2 (CT2) is one popular standard which is widely used in certain European countries. The European Telecommunications Standard Institute (ETSI) has adopted CT2 as its interim standard.

A CT2 system uses 24 bit words as channel markers to establish an RF link. The markers are used to identify an initial link setup transmission and to monitor the quality of the link after establishment. The allowable bit error rate (BER) for a CT2 system is specified as 1 error per thousand bits transmitted. Assuming this BER, the probability of all 24 bits of a channel marker being correctly received is 0.97627, the probability that there is an error in the 24 bit marker is 0.023726, and the probability that there is more than one error is 0.00027198. This means that approximately 2.37%, or 1 out of every 42, of the channel markers will have an error in it. Similarly, 0.0272%, or 1 out of every 3677, of the channel markers will have more than one error in it. This means that 1 out of 42 channel markers will not be correctly detected if all 24 received bits must be correctly decoded for detection, and that 1 out of 3677 channel markers will not be correctly detected if at least 23 of the 24 received bits must be correctly decoded. These statistics can be utilized for more efficient link establishment.

SUMMARY OF THE INVENTION

The present invention provides a method and apparatus for improved establishment of an RF channel link in a multiplex communications system which uses a set data field containing an N-bit word for link establishment and burst synchronization. The present invention allows for a greater bit error rate during initial link setup requests than during the communications which follow. The N-bit word may be transmitted in time slots defined by the communications protocol. These slots can be multiplexed sub-channels. Two different N-bit words are used, one to mark a channel for the initial link setup or polling, and one after an initial link has been established. Both words can also be used to mark a particular time within a multiplex period for purposes of burst synchronization.

In the method and system of the present invention, when one communications device desires to initiate a communications link with a second communications device, the first device sends an initial link setup or polling transmission to the second device. This transmission contains the set data field which, in turn, contains an N-bit word consisting of a predetermined N-bit channel marker. The N-bit channel marker may or may not be repeated during the transmission.

The second communications device receives the transmission and decodes the data contained therein. If N-X bits of the predetermined N-bit channel marker are received and decoded correctly (X<<N), and the second device is correctly identified as the one being polled, the second device will respond to the initial link setup or polling request by sending a transmission to the first device indicating that the request was correctly received. This transmission contains the same set data field originally sent by the first device, but the N-bit word is now replaced with a N-bit synchronization marker. The first communications device then receives this response and continues communication over the link. Hereafter, the N-bit word in the set data field will consist of the N-bit synchronization marker. From this point on, the second device will decode the N-bit synchronization word and consider it correctly received only if N-Y bits are correctly received. The allowable error (Y) in receiving the N-bit synchronization word is less than the allowable error (X) in receiving the N-bit channel marker. The system generates a signal which indicates whether the synchronization marker was correctly received. This signal can then be used by the system to monitor the quality of the RF communications link.

Without the present invention, initial link setup can not be realized unless all N-bits of the N-bit channel marker are correctly received. While this criteria may be necessary for the correct use of synchronization markers, a less stringent criteria for channel marker detection may be acceptable. When this is true, more efficient link setup can be realized by implementing the present invention.

BRIEF DESCRIPTION OF THE DRAWINGS

For a more complete understanding of the present invention and for further objects and advantages thereof, reference may now be had to the following description in conjunction with the accompanying drawings in which.

DETAILED DESCRIPTION

The following description primarily addresses a preferred exemplary embodiment of the present invention. A person skilled in the art, however, will recognize that there are many possible ways to implement the present invention, and that these embodiments may be used in a wide variety of applications and circumstances.

The following detailed description also addresses the preferred exemplary embodiment in the context of a certain application for a cordless telephone system which conforms to the CT2 standard. Persons skilled in the art will, nevertheless, recognize the alternative applications, aspects and embodiments of the present invention which are possible. All those other applications, aspects and embodiments are hereby expressly included in, and form a part of, the present invention.

Generally, the preferred exemplary embodiment of the present invention includes an apparatus and method for detecting a marker included in the link establishment messages exchanged in a RF communications system. This preferred exemplary embodiment of the present invention is particularly suited in RF communications applications in which it is critical that the initial link request message be recognized immediately upon its first reception.

The preferred exemplary embodiment of the present invention may be implemented using an AMD AM79C410 integrated circuit which is designed for use in a cordless phone system complying with the CT2 protocol. This integrated circuit was disclosed in co-pending, commonly assigned applications Ser. Nos. 07/917,497; 07/917,489; 07/917,488; 07/918,503; 07/918,627; 07/918,626; 07/918,625; 07/918,624; 07/918,631; 07/918,632; 07/918,622; 07/918,621, each filed on Jul. 21, 1992, which disclosures are hereby incorporated herein by reference.

Figures 1A, 1B:
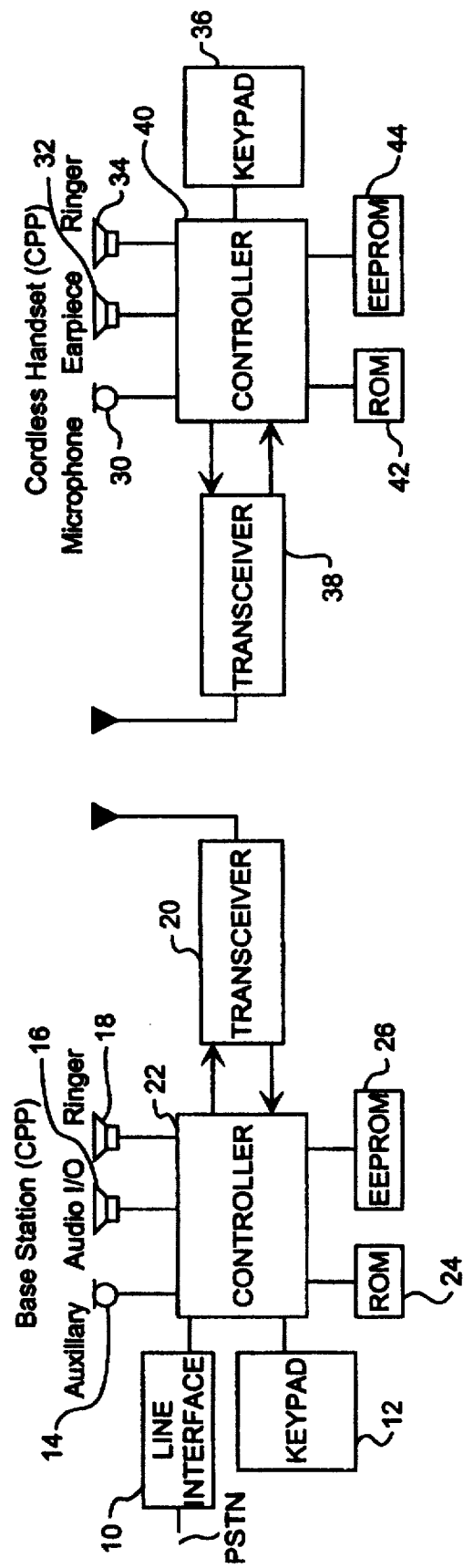
FIGS. 1A–B is a block diagram of a cordless telephone system, referred to as a cordless telephone apparatus (CTA) in the CT2 standard, including a fixed base station (FIG. 1A), referred to as the cordless fixed part (CFP) in the CT2 standard, and a portable cordless handset (FIG. 1B), referred to as the cordless portable part (CPP) in the CT2 standard.

Referring now to FIGS. 1A–B, the CT2 cordless telephone apparatus (CTA) consists of a cordless fixed part (CFP) which is shown in FIG. 1A and a cordless portable part (CPP) which is shown in FIG. 1B. The CFP interfaces with the public switched telephone network (PSTN) through a line interface 10. The CFP includes a keypad 12, an auxiliary port 14, an audio I/O (input/output) port 16, a ringer 18, a transceiver 20 by which it transmits and receives RF communications to and from the CPP, and control circuitry which controls the operation of the other CFP components. The control circuitry includes a controller 22 which is connected to a read only memory (ROM) 24 and an electrically erasable programmable read only memory (EEPROM) 26.

Referring now to FIG. 1B, the CPP includes a microphone 30, an earpiece 32, a ringer 34, a keypad 36, a transceiver 38 by which it transmits and receives communications to and from the CFP, and control circuitry which controls the operation of the other CPP components. The control circuitry in the CPP, like the control circuitry in the CFP, includes a controller 40 which is connected to a ROM 42 and an EEPROM 44. The controllers 22, 40 in the CFP and CPP, respectively, may be implemented with the above-referenced AMD 79C410 controller chip.

Figure 2:
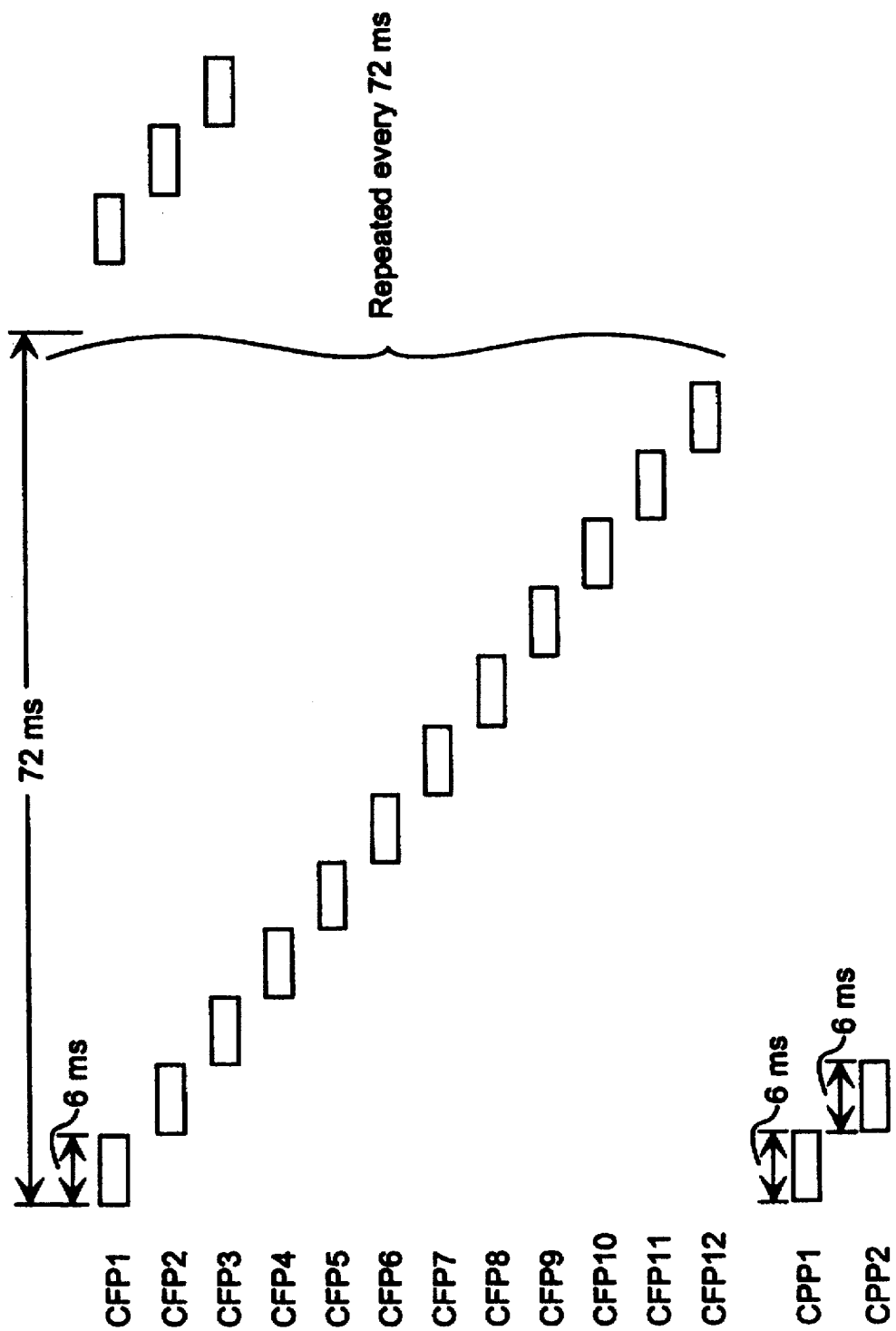
FIG. 2 illustrates a time multiplexed RF channel which can accommodate multiple cordless telephones.

ACTA may be constructed such that the transmissions of two or more CFP-CPP pairs are time division multiplexed on the same frequency. An example of this type of scheme uses 5 RF channels each of which contains 12 time slots. On each RF channel, each CFP-CPP pair has 1/12th of the available air time for communications. Within such a system a total of 60 CFP-CPP pairs can be accommodated. Each CFP transmits messages in its assigned time slot on an assigned frequency. FIG. 2 shows the time slot allocation for one frequency channel. Each time slot lasts for 6 ms. Two consecutive time slots are spaced 72 milliseconds apart. A CPP accesses this system by scanning for an available channel and time slot.

Upon switch-on, or moving into a new system, the CPP will scan until an available channel and slot is found in which a CFP is transmitting a MUX2 idle message. The CPP then synchronizes its operation to the slot and its associated CFP. Thereafter, the CPP will scan that time slot every 576 ms in search of a poll by the CFP. The CFP will transmit in that time slot every 72 ms. Therefore, the CPP will scan that time slot 1 out of every 8 times the CFP transmits in that time slot. If the CFP has no information messages to transmit, it will transmit an idle message in MUX2 format.

Figure 3:
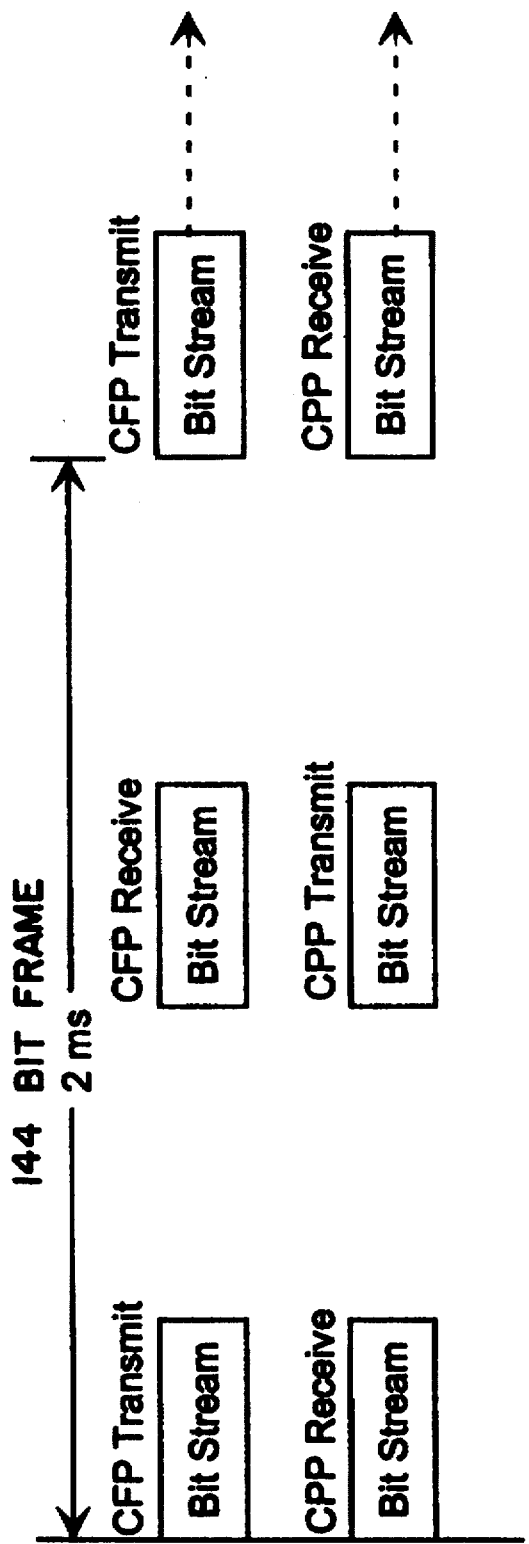
FIG. 3 illustrates the CT2 standard duplex transmission between the CFP and the CPP.
Figure 4:
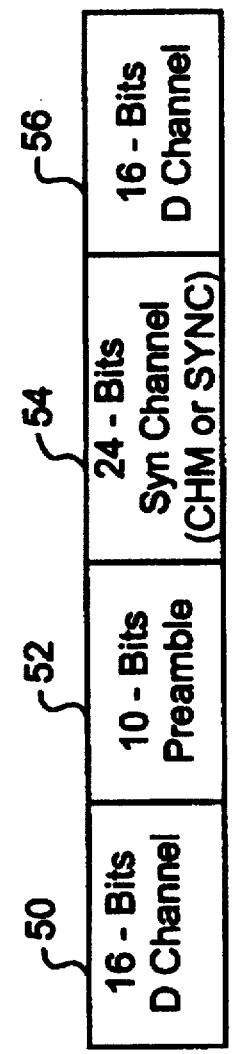
FIG. 4 illustrates the frame structure for the CT2 standard MUX2 channel multiplexing scheme.
Figures 5, 6:
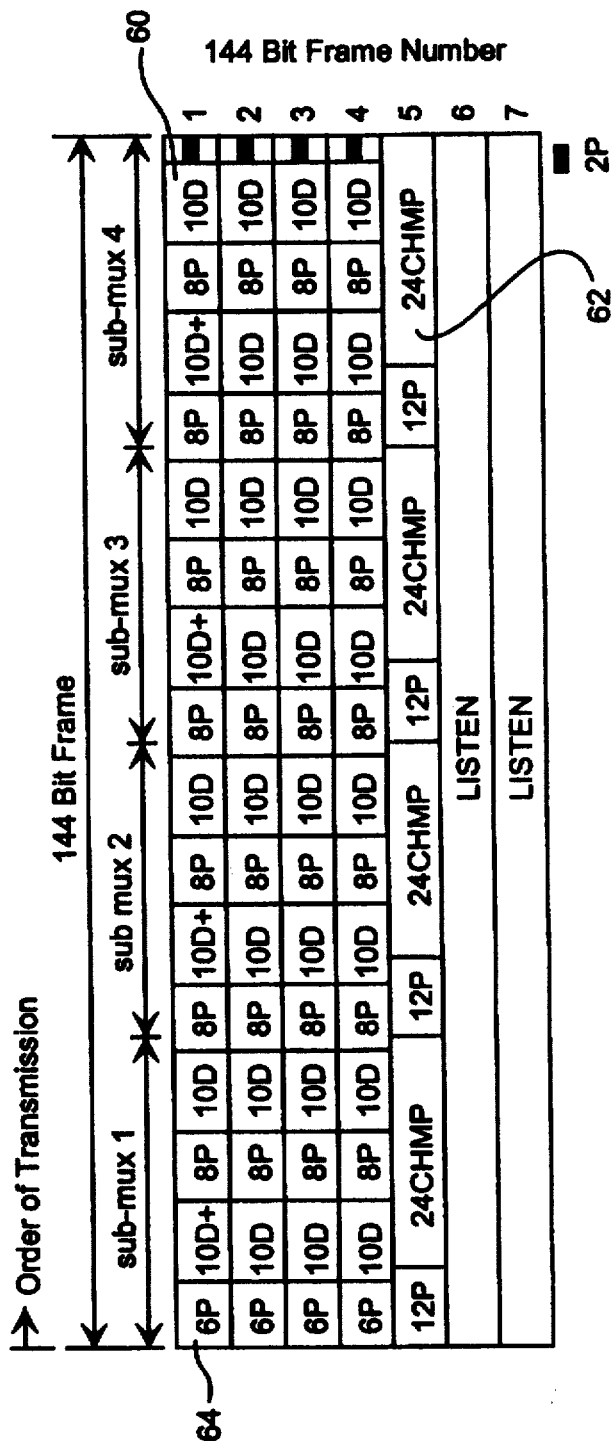
FIG. 5 illustrates the frame structure for the CT2 standard MUX3 channel multiplexing scheme.
FIG. 6 illustrates the CHM and SYNC bit pattern used in a CT2 system.

The CFP and CPP exchange data in a time division duplex mode with an instantaneous data rate of 72 kbits/s. FIG. 3 shows the main transmission scheme used in CT2. In CT2, depending on the situation, certain subchannels are multiplexed within the available bandwidth. According to the requirements of a particular situation, the proportion allocated to each of the subchannels may vary. Each different allocation of subchannel bandwidths is termed a multiplex. CT2 Multiplex two (MUX2) and three (MUX3) are relevant to this discussion. MUX2 and MUX3 are used in situations where a CTA has not set up a link or gained burst synchronization. These two multiplexing schemes are shown in FIGS. 4–5. As shown in FIG. 4, in MUX2 the frame carries two channels, a D channel 50, 56 for data transmission, and a SYN channel 54 which contains a special 24 bit marker pattern. As shown in FIG. 5, MUX3 also carries D 60 and SYN 62 channels. Both MUX2 and MUX3 contain a preamble 52, 64 comprised of alternating 1s and 0s used for synchronization. In MUX2 and MUX3, the special 24 bit patterns in the SYN channel are used to mark an RF channel when a CFP or CPP is attempting to initialize a RF link. They can also be used to mark a particular time in order to allow CTAs to gain burst synchronization. A pattern called CHM is used to mark transmissions within a CTA which is attempting to initialize a RF link and, also, to mark a particular time within the multiplex format. A pattern called SYNC is used when an initial link already has been established. FIG. 6 shows the four different CHM and SYNC bit patterns used in CT2. When the CHM is transmitted from the CFP, a CHMF bit pattern is transmitted. When the CHM is sent from the CPP, a CHMP bit pattern is sent. A SYNC pattern transmitted from the CFP contains the SYNCF pattern, and a SYNC sent from the CPP contains the SYNCP pattern.

Figure 7:
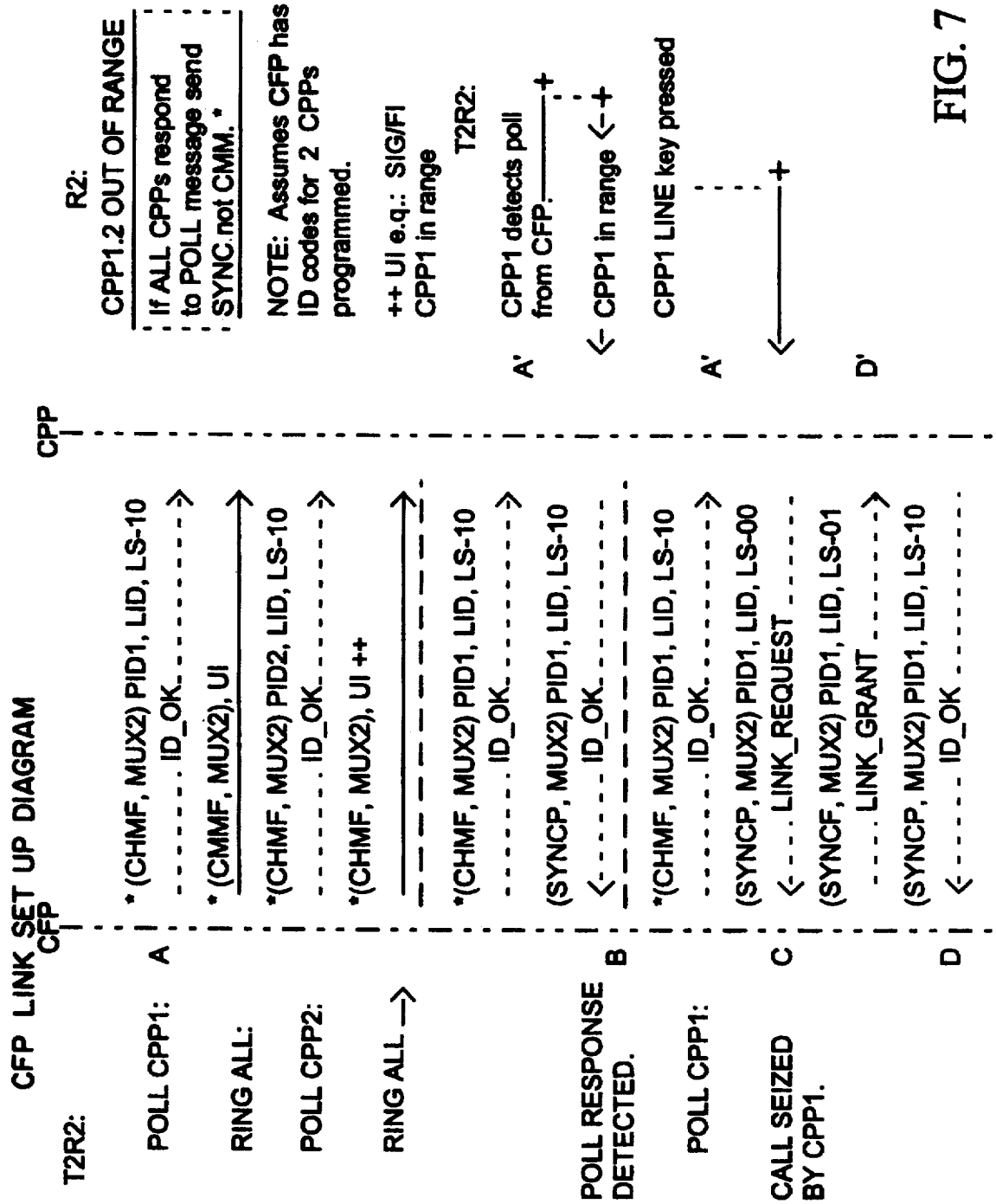
FIG. 7 illustrates the messages exchanged when a link set up is initiated by the CFP.
Figure 8:
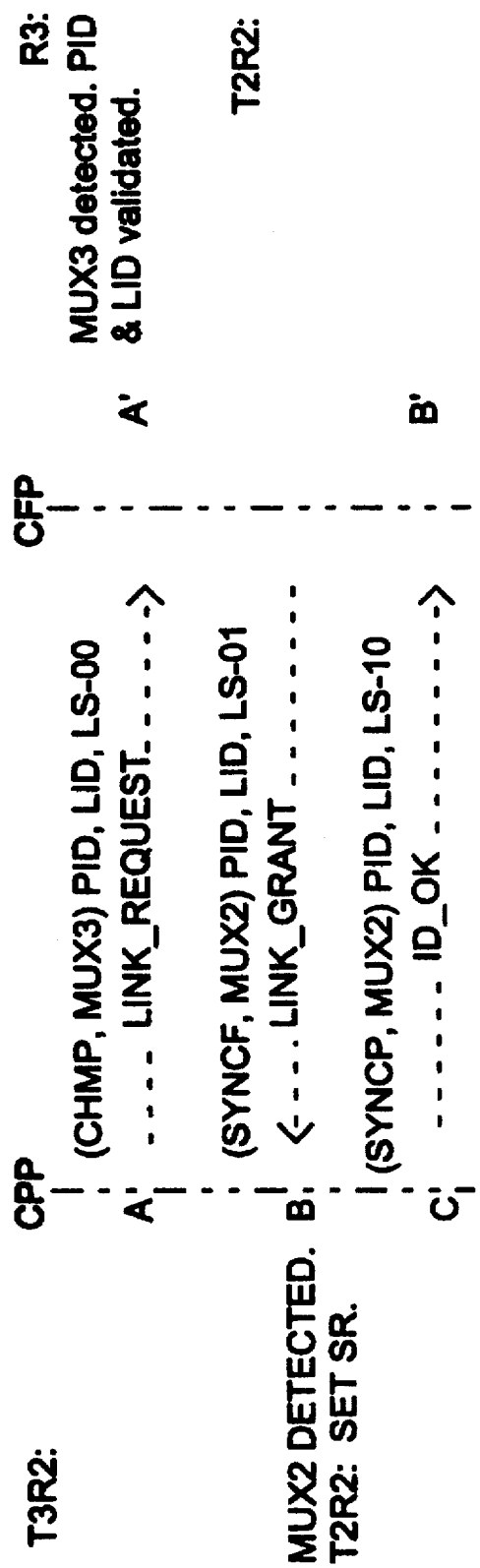
FIG. 8 illustrates the messages exchanged when a link setup is initiated by the CPP.
Figure 9:
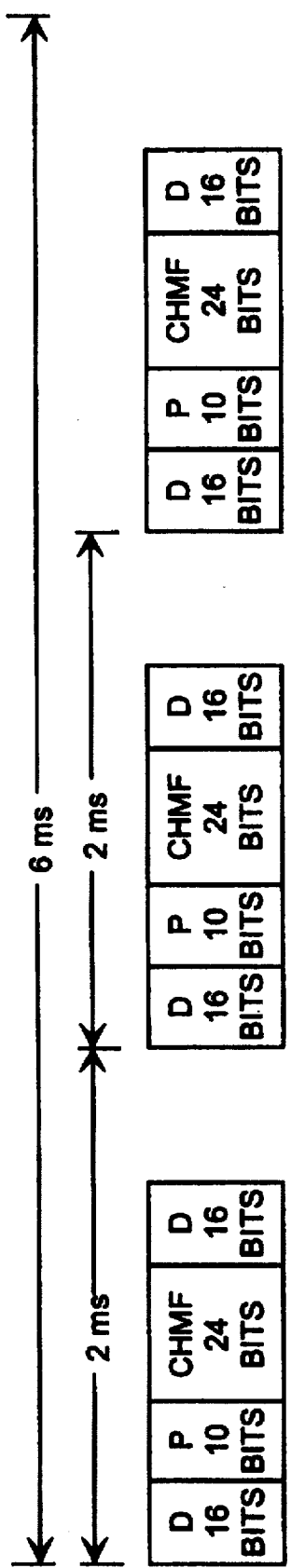
FIG. 9 illustrates the ID_OK message sent from the CFP.

Link setup between a CPP and CFP is accomplished according to the procedures shown in FIGS. 7–8. The CFP and CPP exchange transmissions in MUX2 or MUX3 format with the SYN channel containing either the 24-bit CHM or the 24-bit SYNC. FIG. 7 shows the CFP initiated link establishment sequence. When the CFP polls a CPP for an incoming call, it transmits an ID OK message in MUX2 format with CHMF in the SYN channel and the correct identification data for the CPP or group of CPPs being polled in the D channel. This initial ID_OK message which is sent by the CFP consists of three MUX2 formatted data frames. There is one 24-bit CHMF in the SYN channel of each frame or three CHMFs in each OK_ID message. FIG. 9 shows the structure of this message. The structures of the other messages exchanged are similar. The data contained in the D channel indicates what type of message it is and the identity of the sender and receiver.

Upon correctly receiving the 24-bit CHM, the identified CPP, or each polled CPP, will transmit an ID_OK or LINK_REQUEST message back to the CFP. The returned ID_OK or LINK_REQUEST message is formatted in MUX2 with SYNCP in the SYN channel and the correct identifying data in the D channel. The CPP returns the ID_OK message as a response to a poll when it is being polled in a group. In this case, the CFP will answer with a second ID_OK containing the correct identifying information for the CPP of the group chosen to receive the call. The CPP sends the LINK_REQEST message only after the CPP determines that it is the only CPP being polled or the user takes the call. Upon receiving the LINK_REQUEST message the CFP responds with a LINK_GRANT message in MUX2 format with SYNCF in the SYN channel and the appropriate identifying data in the D channel. Upon receiving the LINK_GRANT message, the CPP transmits a MUX2 ID_OK message with SYNCP in the SYN channel back to the CFP. The link is now set up.

When the CPP desires to set up a link with the CFP, it transmits a LINK_REQEST message in MUX3 with CHMP in the SYN channel and appropriate identifying data in the D channel. This is shown in FIG. 8. Upon correctly receiving the 24-bit CHMP and verifying the identifying data, the CFP sends a LINK_GRANT message formatted in MUX2 in response. This LINK_GRANT message contains SYNCF in the SYN channel and appropriate identifying data in the D channel. The CPP then responds with an ID_OK message in MUX2 with SYNCP in the SYN channel and appropriate identifying data in the D channel. The link is now set up.

Figure 10A:
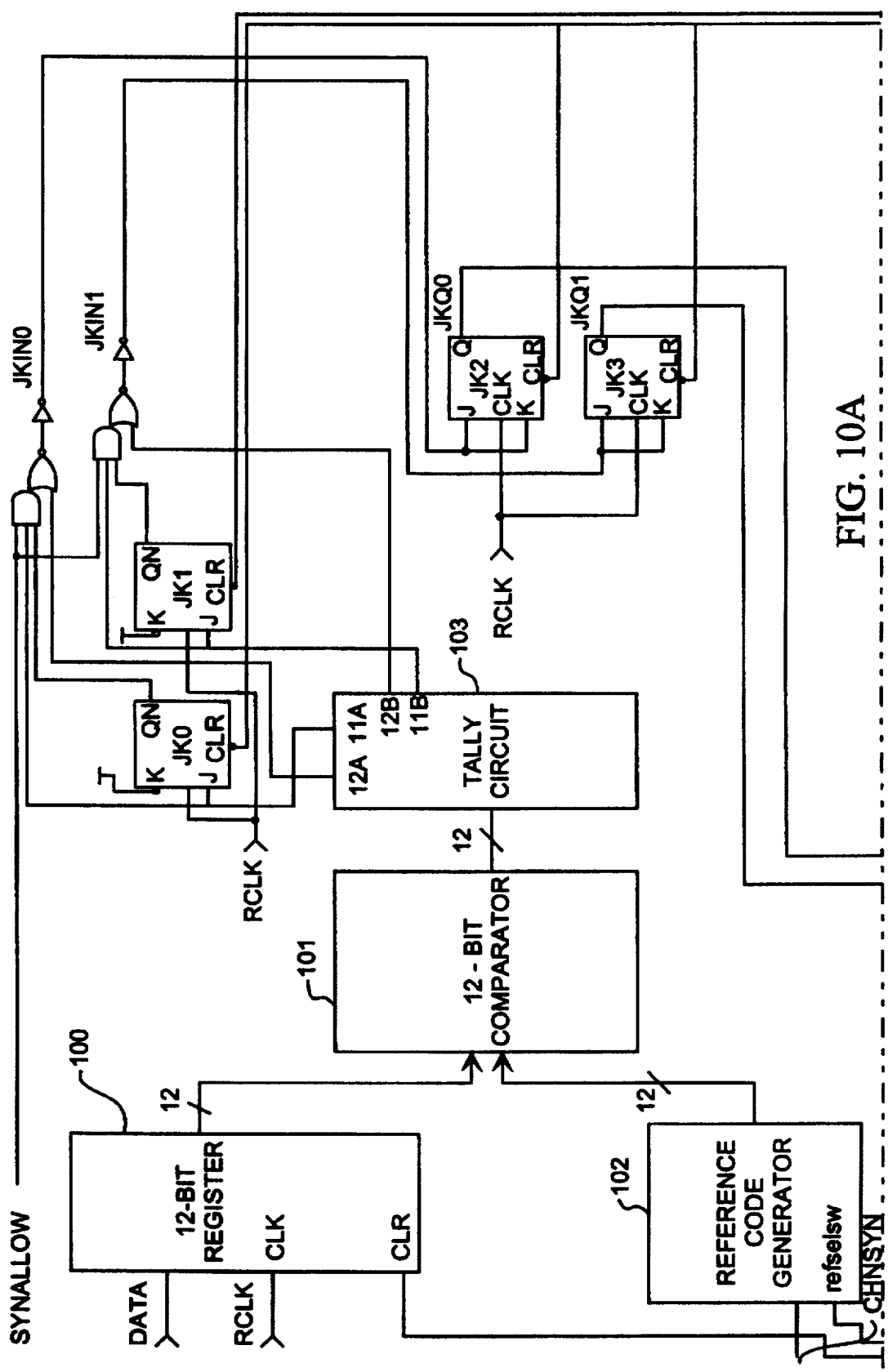
FIG. 10 is a block diagram of a CHM or SYNC detection circuit used in the preferred exemplary embodiment of the present invention.
Figure 10B:
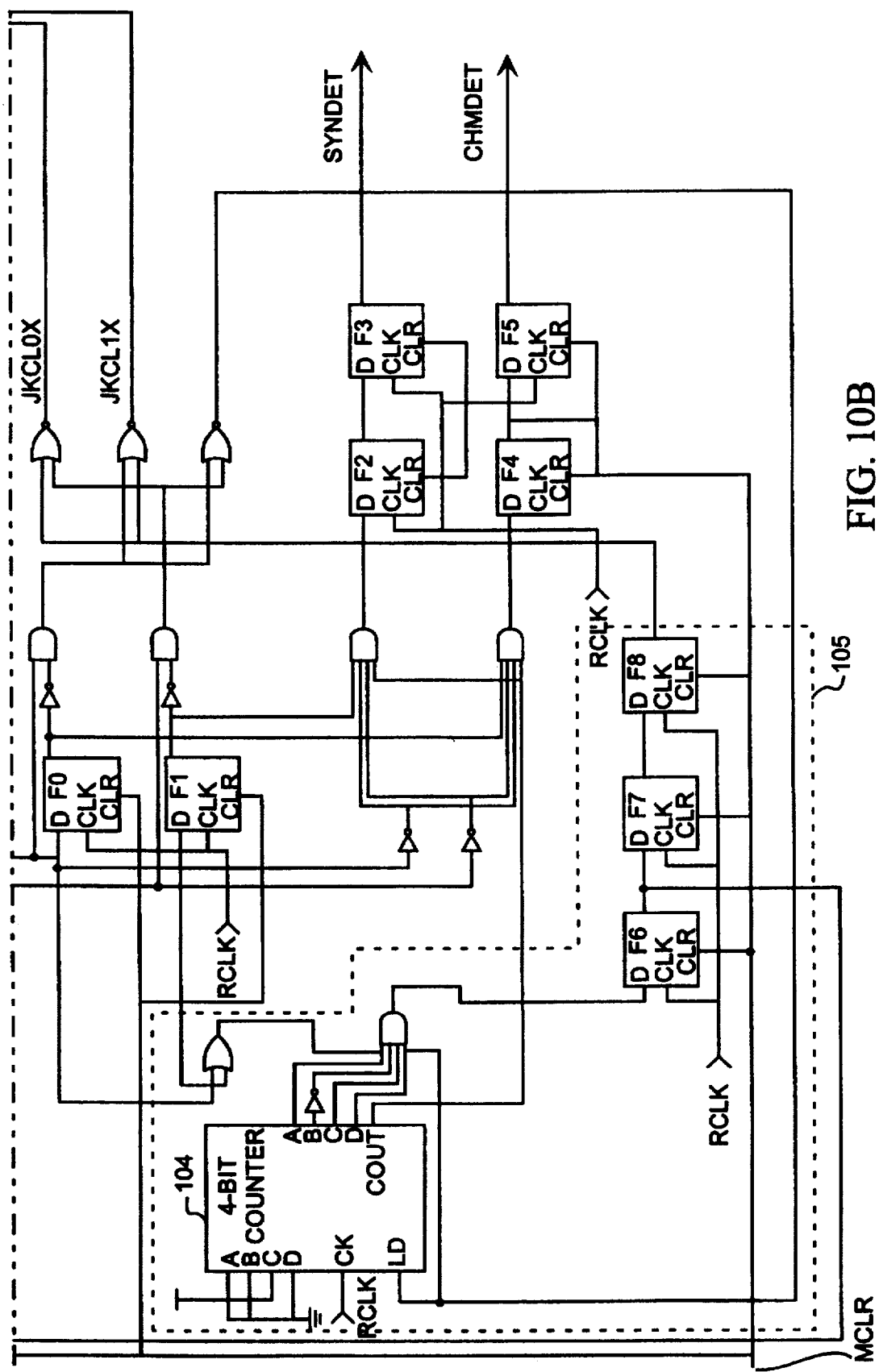

Referring now to FIG. 10, there is shown therein a block diagram of a detection circuit which may be used to implement the present invention within the controller 40 of the CPP. The detection circuit comprises logic elements which monitor the bit stream received at the CPP for the presence of the 24-bit CHMF or SYNCF words which are sent when the MUX2 or MUX3 format is being used. The SYNALLOW input is used to set the detection criteria for the CHMF or SYNCF. When SYNALLOW is high, at least 23 of 24 bits must be correctly received for detection. When SYNALLOW is low, all of the CHMF or SYNCF 24 bits must be correctly received for detection. The received data stream is input at the DATA input. Input CHMSYN is used to select CHM search or SYN search. The RCLK input is a 72 khz clock.

If a link has not been established, the input SYNALLOW is set to high. SYNALLOW sets the criteria for CHM detection to at least 23 bits correctly received. CHMSYN is set high to cause a comparator 101 to compare the input data with the expected CHMF pattern. The CPP is now waiting for a MUX2 formatted message containing CHMF.

The detection circuit monitors the received bit stream. The circuit has been initially reset by a clear signal at input MCLR. When an incoming call is received at the CFP, the CFP polls the CPP on the frequency and time slot to which the CPP has synchronized. The 12 latest received bits are clocked into a 12 bit register 100 and input to the comparator 101 in parallel. The comparator 101 compares these 12 bits with the first 12 bits of the known CHMF pattern. The bit-by-bit comparison results are fed to a tally circuit 103. The tally circuit 103 will generate a high output at output 11B if 11 of the 12 bits being compared match and a high at output 12A if all 12 of the bits being compared match. A high at either output causes JKIN0 to go high for 1 bit period. This pulse at JKIN0 toggles JK2 to cause output JKQ0 to go high. JKQ0 going high clears JK1 and also resets the 4 bit counter 104 to restart. The detection circuit continues to receive the incoming bit stream in the 12-bit register 100.

If a pulse at JKIN0 was caused by output 11A in the tally circuit 103, JK0's QN output will be set to low and output 11A can not affect JKIN0 until JK0 is cleared. If a pulse was caused at JKIN0 by output 12A. JK0's output QN remains high and both of the 11A and 12B outputs can still cause a pulse at JKIN0. This means that if 11 of the first 12 received bits were correctly decoded and if the next 12 bits are correctly decoded, the CHMF will be detected and a second 1 bit pulse will be generated at JKIN0. If all 12 of the first 12 bits were correctly decoded and at least 11 of the next 12 bits are correctly decoded, the CHMF will be detected and a second 1 bit pulse will be generated at JKIN0.

Figure 11:
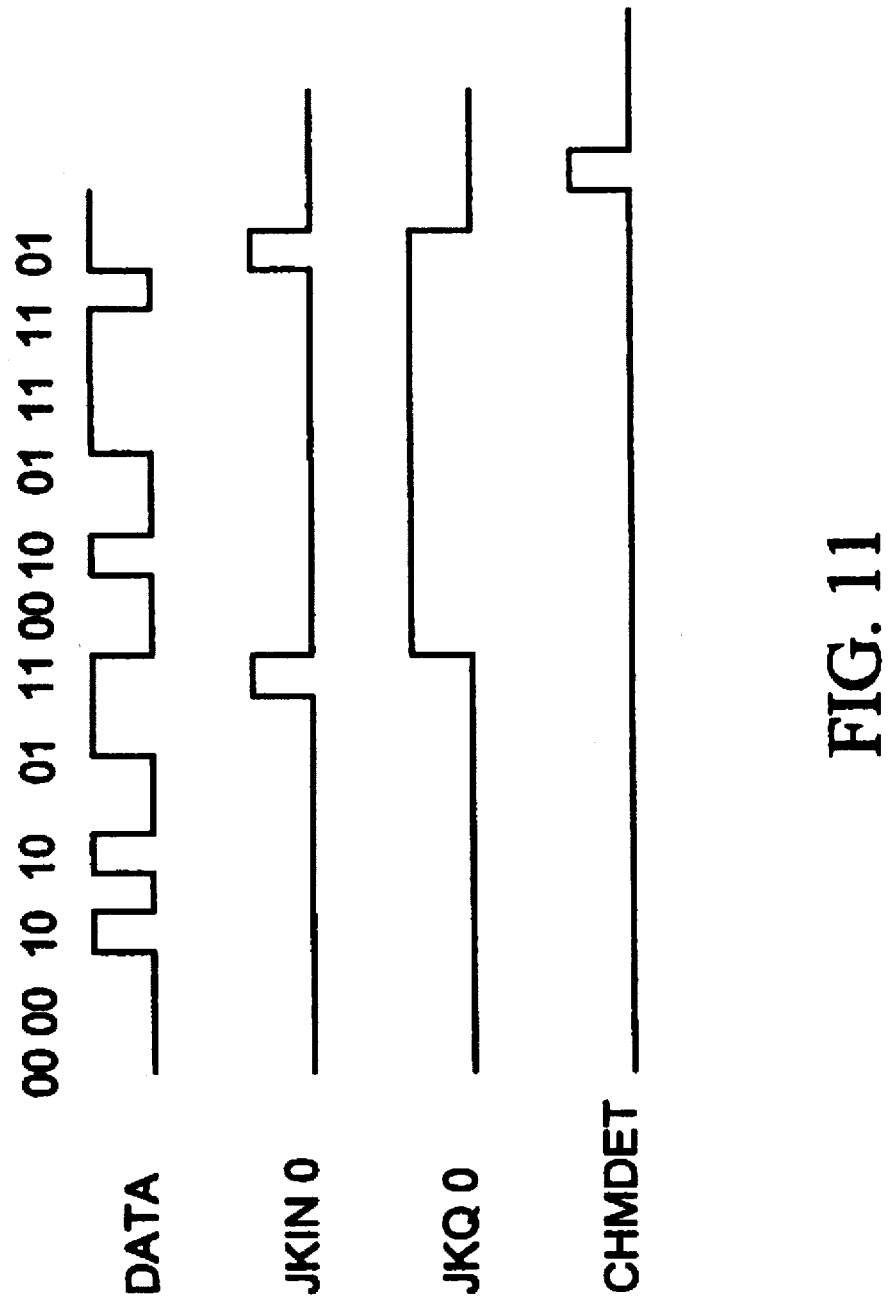
FIG. 11 illustrates signal waveforms generated in the circuit of FIG. 10 during CHMF detection.

If JKQ0 is still high when the second 12 of expected 24 bits are received, the refselsw input to the reference code generator 102 is set by the 4-bit counter 104 through D flip-flop F6 to cause a comparison to be made with the second 12 bits of the known 24 bit CHMF. A second pulse will be generated at JKIN0 if these second 12 bits match. In this manner, the 2 pulses at JKIN0 will be generated if at least 23 of 24 bits are correctly received. If the second pulse occurs, then JK flip-flops JK0, JK1, JK2 and JK3 are cleared and a CHMDET signal is generated through D flip-flops F4 and F5. FIG. 11 shows the timing of detection circuit signals when a CHMF is detected. If only the first pulse is received at JKIN0, the timing logic circuit 105 waits 2 bit periods after the second pulse should have been received and clears JK flip-flops JK0, JK1, JK2 and JK3 through D flip-flops F6, F7 and F8. The detection circuit now returns to monitoring the received bit stream for the first 12 bits of CHMF.

If a CHMDET signal is generated, the procedure to finish establishing the link is invoked. SYNALLOW input is set to logic level low. Input HYSYN is set to select SYNC compare. At this point, all 24 bits of the received SYNCF must be received correctly in order for them to be detected. The CPP and CFP then begin to exchange the messages necessary to establish the link as shown in FIG. 7. When the first LINK_REQUEST message is sent from the CPP to the CFP, the CPP controller 44 sets the detection circuit inputs so that the circuit will search for SYNC in the 24 bit SYN channel.

When SYNALLOW is set high, the detection circuit detects SYNCF only if all 24 bits are correctly received. The circuit functions substantially in the same manner as when searching for CHMF, except that signals JKIN1, JKQ1 and SYNDET are used in place of JKIN0, JKQ0, and CHMDET. The detection circuit monitors the received bit stream and generates a pulse lasting for 1 bit period at JKIN1 if the first 12 bits of SYNCF are correctly received. If this first pulse is generated, the circuit then monitors the next 12 bits in the received bit stream and generates a second pulse lasting 1 bit period if these bits are correctly received. If the second pulse is generated, SYNDET goes high indicating that a SYNCF word was received correctly. If a second pulse is not generated, the detection circuit returns to monitoring for the first 12 bits of SYNCF.

It will be appreciated that the circuit of FIG. 10 could also be used in the controller 22 of the CFP for detecting CHMP and SYNF bit patterns transmitted from the CPP.

The present invention, as described above, has particular advantages when used in applications where improved recognition of a CHM bit pattern for initial link setup transmission is desired. This is the case with the system illustrated in FIG. 2. When a CFP desires to initiate a link with the CPP which has synchronized to its time slot, it will send a polling message in that time slot. The polling message will be an ID_OK message in MUX2 format with CHMF in the SYN channel and the appropriate identifying data in the D channel as shown in FIG. 9. The message will contain three MUX2 data frames. Each data frame will contain the CHMF in the SYN channel. This message will be transmitted nine times once every 72 ms, each time in the appropriate slot, before the CFP terminates the poll. If the CPP scans the time slot every 576 ms it will detect the polling message in the CFP's first transmission or in one of the second through eighth transmissions. The particular time slot in which the CPP detects the message depends on when the CFP began transmission in relation to the CPP's scanning period.

As an example, assume that the CPP scans the time slot which contains repetition eight of the polling message. If the CPP correctly identifies the CHMF in the first MUX2 frame, the CPP will transmit the appropriate response to the CFP to complete a link. The CPP has to correctly decode the first CHMF in any polling message in order to correctly decipher the D channel identifying data contained in the message. If the CPP does not correctly identify the first CHMF in slot 8, it cannot decipher the D channel data in slot 8. In this case, the CPP will scan the next repetition in slot 8, 72 ms later. If it doesn't correctly decode the first CHMF in repetition 9, the poll will go unanswered since no more repetitions which contain a first CHMF have been transmitted. Generally, if the CPP first encounters the message on its Mth repetition it will have 10-M chances to correctly catch the first CHMF in a following repetition.

In the preferred embodiment of the present invention, the invention is implemented in the controller 40 of the CPP. When the CPP scans a particular time slot for an initial ID_OK message, the SYNALLOW input signal to the detection circuit is held at high logic level. The circuitry will then indicate that a CHMF has been received if at least 23 bits of the 24-bit word are correctly decoded. This improves the efficiency of receiving incoming calls to the system.

If it is required that at least 23 bits be received correctly to acknowledge the reception of the CHMF, there is a 0.0272%, or 1 out of 3677, chance of missing the CHMF. In the multiplexing system described above, if the CPP was scanning the 8th repetition of the ID_OK poll message, it would have to miss the first repetition of the CHMF in both the 8th and 9th slots to miss the poll. The chance of this happening is (1/3677) (1/3677) or 1/13,520,329.

If it was required that all 24 bits be received correctly to acknowledge reception of the CHMF, there would be a 2.37% chance of missing a CHMF. In the multiplexing system described above, if the CPP was scanning the 8th repetition of the ID_OK poll message, it would have to miss the first repetition of the CHMF in both the 8th and 9th slots to miss the poll. The chance of this happening is (1/42)(1/42) or 1/1764. With the present invention, therefore, the chances of a missed poll can be reduced.

Those skilled in the art will readily recognize that numerous variations and substitutions may be made in the present invention and its use and configuration to achieve substantially the same results as achieved by the embodiments and, in particular, the preferred embodiment expressly described herein. Each of these variations is intended to be included in the description herein and forms a part of the present invention. The foregoing detailed description is, thus, to be clearly understood as being given by way of illustration and example only, the spirit and scope of the present invention being limited solely by the appended claims.

What is claimed is:

1. A method of establishing and monitoring an RF link between a first radio communications device and a second radio communications device comprising the steps of:

transmitting an initial link setup message including a synchronization data field containing a first predetermined N-bit word from said first radio communications device to said second radio communications device;

receiving said initial link setup message at said second radio communications device;

analyzing said initial link setup message at said second radio communications device to determine if at least N-X bits of said first predetermined N-bit word contained in said synchronization data field in said initial link setup message were received correctly at said second communications device;

establishing a link between said first radio communications device and said second radio communications devices by using link setup messages including said synchronization data field containing a second predetermined N bit word if at least N-X bits of said first predetermined word contained in said synchronization data field in said initial link setup message were correctly received at said second communications device; and monitoring the link establishment at said second radio communications device by analyzing said second predetermined N bit word contained in said synchronization data field in link setup messages received from said first radio communications device and generating a signal if N-Y bits were correctly received.

2. The method of claim 1 in which said first radio communication device comprises a CFP and said second radio communication device comprises a CPP.

3. The method of claim 2 in which said initial link setup message comprises a ID_OK message.

4. The method of claim 3 in which said first predetermined N-bit word comprises a 24 bit CHM pattern.

5. The method of claim 4 in which said second predetermined N-bit word comprises a 24 bit SYNC pattern.

6. The method of claim 5 in which said step of establishing a link further comprises:

transmitting a link_request message from said second radio communication device to said first radio communications device; transmitting a link_grant message from said first radio communication device to said second radio communication device in response to the reception of said link_request message; and transmitting an ID_OK message from said second radio communication device to said first radio communication device in response to the reception of said link_grant message.

7. The method of claim 1 in which said first radio communication device comprises a CPP and said second radio communication device comprises a CFP.

8. The method of claim 7 in which said initial link setup message comprises a link_request message.

9. The method of claim 8 in which said first predetermined N-bit word comprises a 24 bit CHM pattern.

10. The method of claim 9 in which said second predetermined N-bit word comprises a 24 bit SYNC pattern.

11. The method of claim 10 in which said step of establishing a link further comprises:

transmitting a link_grant message from said second radio communication device to said first radio communication device; and transmitting an ID_OK message from said first radio communication device to said second radio communication device in response to the reception of said link_grant message.

12. A system of establishing and monitoring an RF link between a first radio communications device and a second radio communications device comprising:

means for transmitting an initial link setup message including a synchronization data field containing a first predetermined N-bit word from said first radio communications device to said second radio communications device;

means for receiving said initial link setup message at said second radio communications device;

means for analyzing said initial link setup message at said second radio communications device to determine if at least N-X bits of said first predetermined N-bit word contained in said synchronization data field in said initial link setup message were received correctly at said second communications device;

means for establishing a link between said first radio communications device and said second radio communications devices by using link setup messages including said synchronization data field containing a second predetermined N bit word if at least N-X bits of said first predetermined word contained in said synchronization data field in said initial link setup message were correctly received at said second communications device; and means for monitoring the link establishment at said second radio communications device by analyzing said second predetermined N bit word contained in said synchronization data field in link setup messages received from said first radio communications device and generating a signal if N-Y bits were correctly received.

13. The system of claim 12 in which said first radio communication device comprises a CFP and said second radio communication device comprises a CPP.

14. The system of claim 13 in which said initial link setup message comprises a ID_OK message.

15. The system of claim 14 in which said first predetermined N-bit word comprises a 24 bit CHM pattern.

16. The system of claim 15 in which said second predetermined N-bit word comprises a 24 bit SYNC pattern.

17. The system of claim 16 in which said means for establishing a link further comprises:

means for transmitting a link_request message from said second radio communication device to said first radio communications device;

means for transmitting a link_grant message from said first radio communication device to said second radio communication device in response to the reception of said link_request message; and means for transmitting an ID_OK message from said second radio communication device to said first radio communication device in response to the reception of said link_grant message.

18. The system of claim 12 in which said first radio communication device comprises a CPP and said second radio communication device comprises a CFP.

19. The system of claim 12 in which said initial link setup message comprises a link_request message.

20. The system of claim 19 in which said first predetermined N-bit word comprises a 24 bit CHM pattern.

21. The system of claim 20 in which said second predetermined N-bit word comprises a 24 bit SYNC pattern.

22. The system of claim 21 in which said means for establishing a link further comprises:

means for transmitting a link_grant message from said second radio communication device to said first radio communication device; and means for transmitting an ID_OK message from said first radio communication device to said second radio communication device in response to the reception of said link_grant message.

23. An apparatus, contained in a first RF device, for establishing and monitoring an RF link with a second RF device, said apparatus comprising:

a transceiver for receiving, and transmitting, RF signals sent from, and to, said second RF device;

a controller for receiving, and sending, digital baseband signals sent from, and to, said transceiver and converting said digital baseband signal received from said transceiver to digital form; and a circuit, contained in said controller, which receives the digital form of the signal sent from said second RF device and having a control input which, when set at a certain logic value, causes said circuit to generate an output signal when at least N-X bits of a predetermined N bit pattern are received correctly, and when set at the opposite logic value, causes said circuit to generate an output signal only if all N bits of said predetermined N bit pattern were correctly received.

* * * * *

UNITED STATES PATENT AND TRADEMARK OFFICE
CERTIFICATE OF CORRECTION

PATENT NO.   : 5,697,062
DATED        : December 9, 1997
INVENTOR(S)  : Hendrickson Page 1 of 1

It is certified that error appears in the above-identified patent and that said Letters Patent is hereby corrected as shown below:

<u>Column 4,</u>
Line 56, "ACTA may be constructed" should read -- A CTA may be constructed --.

Signed and Sealed this

Fourteenth Day of January, 2003

JAMES E. ROGAN
*Director of the United States Patent and Trademark Office*